United States Patent [19]

Kondo

[11] Patent Number: 5,072,661
[45] Date of Patent: Dec. 17, 1991

[54] APPARATUS AND METHOD FOR OBTAINING HOT BEVERAGE EXTRACT LIQUID

[76] Inventor: Takashi Kondo, 6-4,Oaza Furugo, Oita City, Oita Prefecture, Japan, 870

[21] Appl. No.: 481,052

[22] Filed: Feb. 16, 1990

[30] Foreign Application Priority Data

Feb. 22, 1989 [JP] Japan ................... 1-42074

[51] Int. Cl.$^5$ .................... A47J 31/16; A23F 5/00; A23F 3/34
[52] U.S. Cl. ....................... 99/296; 99/295; 99/306; 426/433; 426/435
[58] Field of Search ............... 99/279, 295, 306, 296, 99/316; 426/433, 435, 77

[56] References Cited

U.S. PATENT DOCUMENTS

| | | | |
|---|---|---|---|
| 710,133 | 9/1902 | Baker | 99/296 |
| 843,727 | 2/1907 | White | 99/296 |
| 868,561 | 10/1907 | Hoffman | 99/296 |
| 1,160,011 | 11/1915 | Swing | 99/296 |
| 2,401,529 | 6/1946 | Varney et al. | 99/279 |
| 2,732,787 | 1/1956 | Osborne | 99/295 |
| 3,139,344 | 6/1964 | Weisman | 99/295 |
| 4,143,590 | 3/1979 | Kasakoff | 99/296 |
| 4,386,109 | 5/1983 | Bowen et al. | 426/433 |
| 4,520,716 | 6/1985 | Hayes | 99/295 |
| 4,627,334 | 12/1986 | Shanklin | 426/77 |

FOREIGN PATENT DOCUMENTS

| | | | |
|---|---|---|---|
| 0190912 | 8/1986 | European Pat. Off. | 99/279 |
| 0070101 | 8/1893 | Fed. Rep. of Germany | 99/296 |
| 1292324 | 4/1969 | Fed. Rep. of Germany | 99/295 |
| 1289610 | 2/1962 | France | 99/295 |
| 1364462 | 8/1974 | United Kingdom | 99/295 |

Primary Examiner—William A. Cuchlinski, Jr.
Assistant Examiner—John L. Beres
Attorney, Agent, or Firm—Wenderoth, Lind & Ponack

[57] ABSTRACT

An apparatus and method for obtaining a coffee extract or the like by filtration comprises a vessel body having an opening at one end with the other end closed and an air vent provided with a stopper and located close to the closed end, filter paper for covering the opening of the body, and a tray for receiving a liquid extract (infusion) of coffee, black tea, green tea or the like, the tray being detachable from the body with the filter paper therebetween.

8 Claims, 7 Drawing Sheets

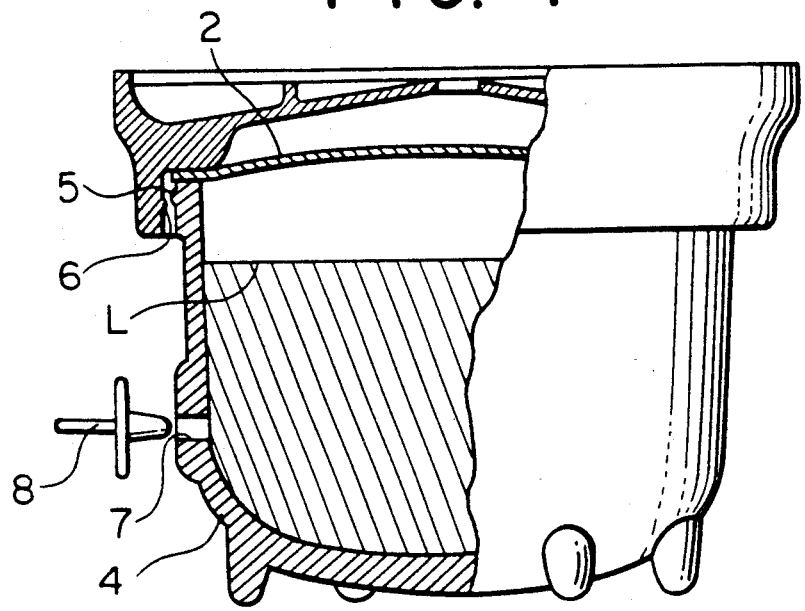
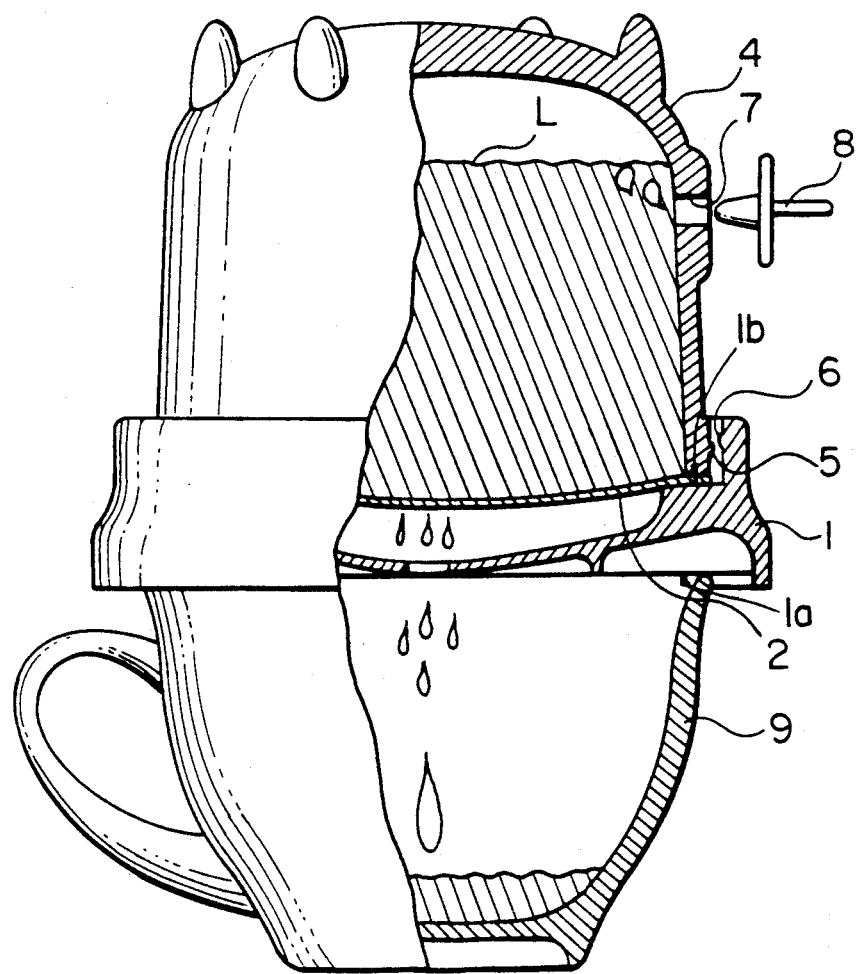

APPARATUS AND METHOD FOR OBTAINING HOT BEVERAGE EXTRACT LIQUID

BACKGROUND OF THE INVENTION

1. Field of the invention

The present invention relates to an apparatus for obtaining an extract or infusion of coffee, black tea, green tea or the like (hereinafter referred to as hot beverage liquid of as coffee extract or the like) by filtration and a method for obtaining a coffee extract or the like by filtration using the apparatus. More particularly, the present invention relates to an apparatus and method for obtaining a coffee extract by filtration according to individual taste quickly and reliably at any time and place as occasion demands insofar as boiling water is available.

2. Description of the prior art

There are various methods of preparing coffee or the like: particularly for coffee, drip coffee preparation is suitable for more than 10 persons, whereas preparation by the paper filter method, siphon method, Neapolitan drip method, percolator method and espresso method are suitable for one or a few persons.

However, all of these methods are disadvantageous in that coffee cannot be satisfactorily brewed without experience and skill when it is employed at home or outdoors. Besides, they entail troublesome work in preparing to mate the coffee and in cleaning up afterward. Since such coffee-making methods are not always opportune in terms of the number of users who desire coffee, various means of preparing coffee, including instant coffee, have been proposed to solve the foregoing problems.

Japanese Patent Application No. 56-156118, for instance, discloses a handy apparatus for obtaining a coffee that is tastier than instant coffee, the apparatus comprising a first vessel containing packs of ground coffee, sugar and milk with filter paper stretched thereon, a cradle for use when the first vessel is set upside down, and a second vessel which doubles as a brewed coffee container, the inverted first vessel being placed on top of the second vessel and wrapped together in gas barrier paper.

Notwithstanding, only the particular coffee contained and packed in the first vessel can be prepared and coffee prepared to satisfy individual tastes.

SUMMARY OF THE INVENTION

An object of the present invention is to provide an apparatus for obtaining a coffee extract or the like by filtration according to personal taste while bringing out its flavor in full.

Another object of the present invention is to provide a method of optimizing the condition of obtaining a coffee extract or the like by filtration.

BRIEF DESCRIPTION OF THE DRAWINGS

FIG. 1 is a partial sectional view of an apparatus for obtaining an extract by filtration according to the present invention.

FIG. 2 is a diagram illustrating a method of obtaining an extract by filtration using the apparatus of FIG. 1.

DETAILED DESCRIPTION OF THE INVENTION

Figure 3A:
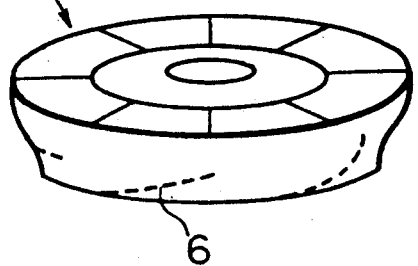
FIGS. 3(a)-3(h) are a perspective view illustrating instruments and attachments constituting another apparatus for obtaining an extract by filtration according to the present invention.
Figure 3B:
Figure 3C:
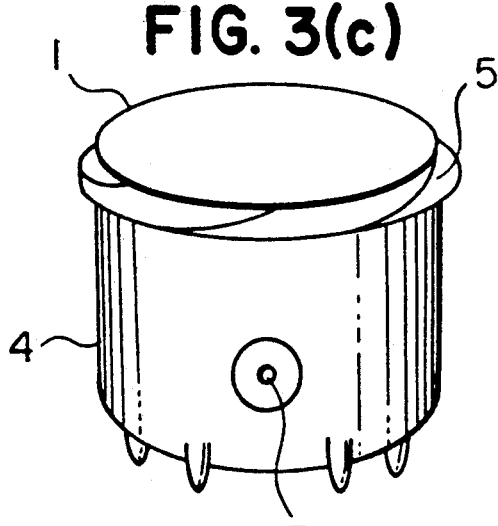
Figure 3D:
Figure 3E:
Figure 3F:
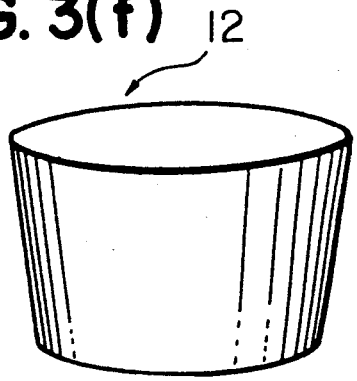
Figure 3G:
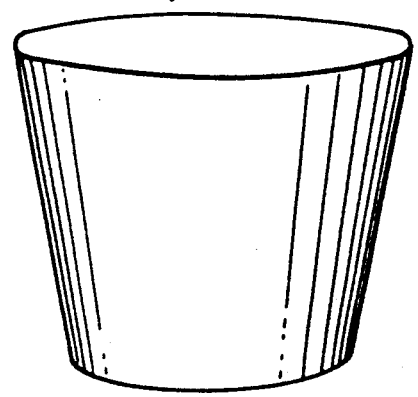
Figure 3H:
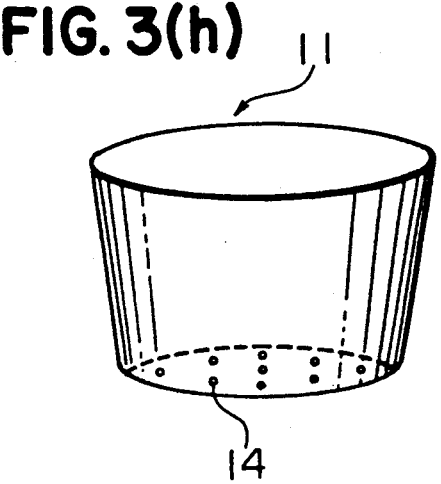

The present inventor directed his attention to the fact that previous apparatus for obtaining a coffee extract or the (or hot beverage extract liquid) like did not meet the needs and desires of drinkers of coffee or the like and contemplated improvements in the apparatus therefor. The reasons for this have been twofold: there had been an absolute disregard of the fact that drinkers of coffee or the like prefer to prepare their drink one cup at a time and no filtration apparatus for enabling them to enjoy their drink in this way was available.

Another reason was that no way was available for securing extraction and filtration of coffee or the like in the optimum condition.

In order to solve the first problem, the apparatus should be capable of implementing the best method of obtaining a coffee extract or the like by filtration according to one's taste, quickly and reliably, of being assembled and disassembled with ease, and of being arranged so that the filter paper, coffee grounds and other expendable items are easily removable for disposal after use.

With respect to the solution of the second problem, boiling water should uniformly be poured over the coffee or the like, which should also remain soaked in the hot water for at least three minutes.

The present inventor therefore developed an apparatus for obtaining a coffee extract or the like by filtration in which boiling water can be uniformly poured over coffee or the like and caused to keep soaking in the hot water for approximately three minutes.

The method according to the present invention comprises the steps of providing a closed-end cylindrical body (hereinafter referred to as the body), (1) putting a desired amount of ground coffee or the like into the body after pouring boiling water therein or (2) pouring boiling water into the body before putting a desired amount of ground coffee or the like therein, covering the open side of the body with filter paper, forming a sealed condition by attaching to the filter paper a tray for receiving a coffee extract liquid or the like, turning upside down the combination of the body and the attached tray and placing it on top of a cup or the like in order to suspend the coffee or the like in the hot water and allow it to settle therein, causing external pressure to act on the coffee extract liquid or the like by introducing air into the body, and letting the coffee extract liquid or the like percolate through the filter paper and the tray into the cup or the like. The aforementioned first and second problems can thus be solved.

The present inventor found that the coffee extract liquid or the like obtained tasted pleasantly sour according to (1) and pleasantly bitter according to (2).

It takes approximately three minutes to complete the suspension and sedimentation after the combination of the body and the tray has been turned upside down, which is the time needed for a coffee extract or the like to be obtained at the best condition. If the time is too short, the coffee will not be sufficiently extracted, whereas if the time is too long, the taste will be spoiled as the extract and tannin start decomposing.

The present inventor also found that a coffee extract or the like could be obtained simply by anyone at any place provided that air was introduced into the body upon the completion of the sedimentation.

Although the load of the liquid in the body is applied to the filter paper when the pressure inside the body is maintained by shutting air off from the body, the coffee extract liquid or the like remains in the body because the pressure in the body and the external pressure (atmospheric pressure) surrounding the body balance with the filter paper therebetween. As a result, the time required is readily secured.

The method of maintaining the pressure in the body by shutting air off from the interior of the body may be replaced with another which comprises the steps of having the body contain a deformable thin film bag beforehand and externally unfolding a margin on the open side of the bag at the opening of the body to shut air off at the gap between the body and the bag, and still another of having the body contain a cup made of thin plastic, paper or the like beforehand and externally unfolding a margin on the open side of the cup at the opening of the body to shut air off from the interior of the cup.

When external pressure is caused to act on the coffee extract liquid or the like in the body by introducing air into the sealed body after passage of a certain time, the coffee extract liquid or the like drips through the filter paper and the tray for receiving the coffee extract liquid or the like into the cup or the like.

At this time, the coffee extract liquid or the like percolates through a layer of precipitated ground coffee and the filter paper. Through such a double process of filtrating, an ideal liquid extracted by filtration, which is clear and free from coffee grounds, is allowed to flow into the cup smoothly and stably.

In this way, it is possible to quickly and reliably obtain an optimum coffee extract liquid suited to one's personal taste and, moreover, the work of cleaning up afterward is extremely simple.

A description will subsequently be given of an embodiment of the present invention with reference to the accompanying drawings.

FIG. 1 is a partial sectional side view of an apparatus for obtaining an extract by filtration according to the present invention. FIG. 2 is a diagram illustrating a process of obtaining an extract by filtration.

An apparatus for obtaining an extract by filtration comprises a tray 1 made of acrylonitrile-styrene resin for receiving a coffee extract liquid or the like, a paper coffee filter 2 made of 100% virgin pulp, i.e. filter paper, a vessel body 4 made of acrylonitrile-styrene resin, a male thread 5 provided on the body 4, a female thread 6 provided on the tray 1 for receiving the coffee extract liquid or the like, an air vent 7 bored in the body 4, and a stopper 8. The tray 1 is provided with a first surface 1a for mounting the cup 9 thereto, and a second surface 1b for mounting the vessel body 4, as shown in FIG. 1.

As shown in FIG. 2, the air vent 7 is bored in the side wall or bottom of the body 4 at any position between the mid-portion covering an area from the face of the filter paper at the bottom of the boiling water poured into the body 4 up to the liquid level L and the bottom of the inverted body 4 when the body 4 is turned upside down and placed on top of a cup 9.

The air vent 7 is employed for shutting off air by inserting the stopper 8 and letting the external pressure act on the coffee extract liquid or the like by removing the stopper 8 so as to introduce air therethrough.

Figure 4A:
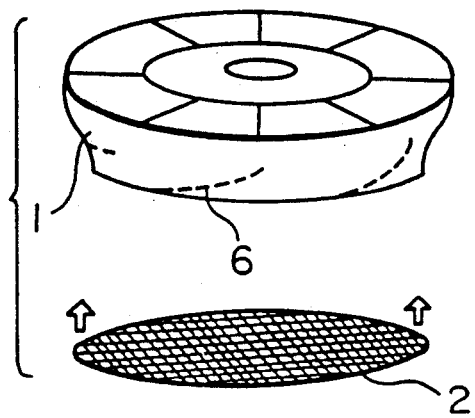
FIGS. 4(a)-4(c) are a perspective view illustrating instruments and attachments constituting still another apparatus for obtaining an extract by filtration according to the present invention.
Figure 4B:
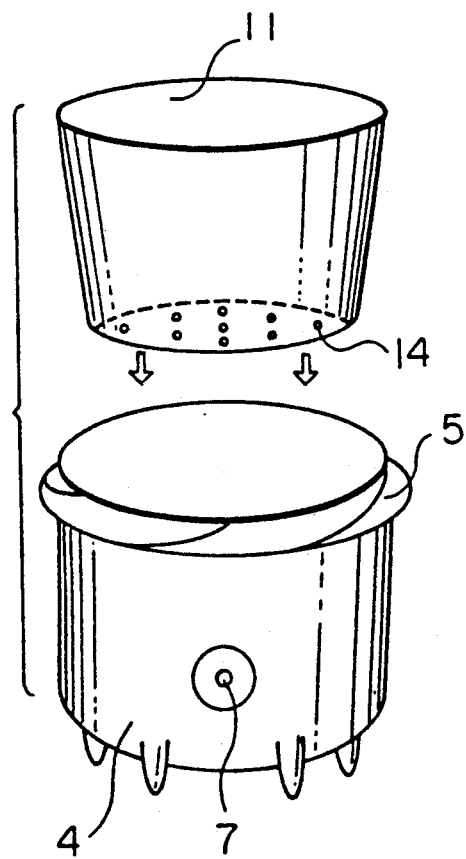
Figure 4C:
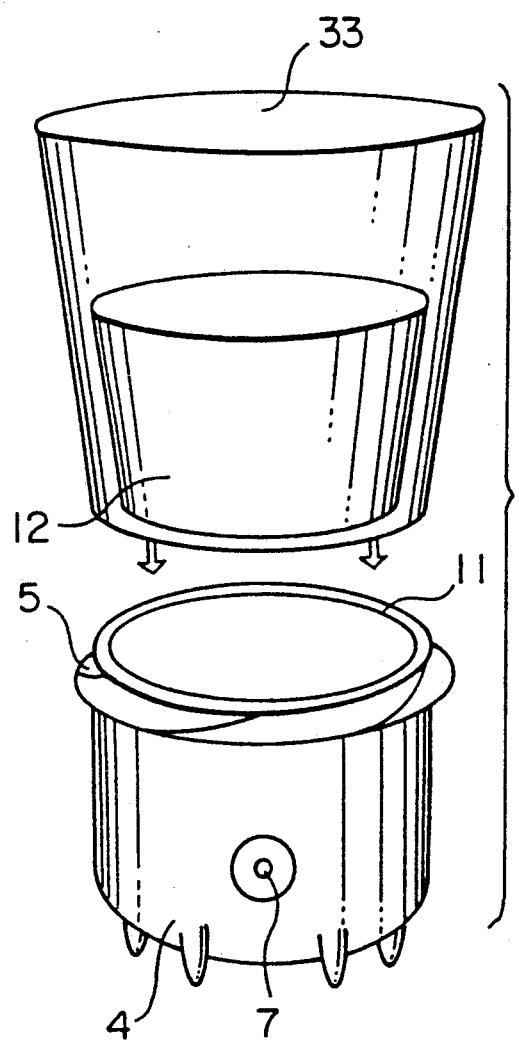

FIGS. 3(a)-3(h) are perspective views illustrating different elements of another embodiment of the present invention. FIGS. 4(a)-4(c) are perspective views illustrating a process of making preparations using the instruments of FIG. 3.

A detailed description will further be given with reference to FIGS. 3(a)-3(h) and 4(a)-4(c).

In FIGS. 3(a)-3(h), numeral 1 denotes a tray made of acrylonitrile-styrene resin for receiving a coffee extract liquid or the like; 2 a paper coffee filter made of 100% virgin pulp, i.e. filter paper; 33 a coffee pack made of thin polyethylene film, i.e. a bag; 4 a vessel body; 5 a male thread provided on the body 4; 6 a female thread provided on the tray for receiving the coffee extract liquid or the like; 7 an air vent bored in the body 4; 8 a stopper for the air vent; 11 an insulating adaptor having a plurality of vent through-holes 14 in the bottom its insulating partition wall being used for preventing the extracted liquid from directly touching the side wall of the body and consequently from being cooled; 12 a guide holder for smoothly inserting the bag 33 into the insulating adaptor 11 or the body 4; and 13 a measuring cup. The instruments designated by numerals 4, 8, 11, 12 and 13 are all made of acrylonitrile-styrene resin.

Figure 5:
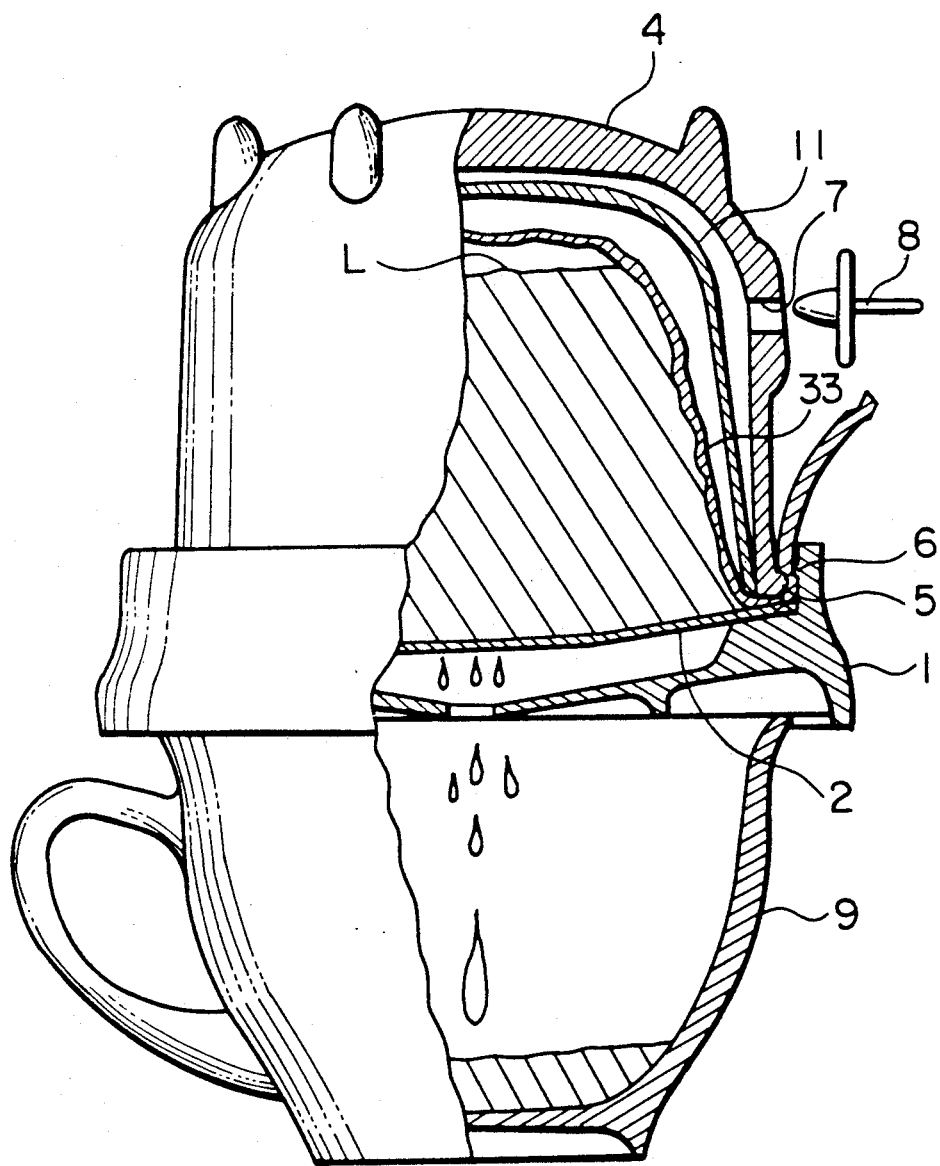
FIG. 5 is a diagram illustrating a method of obtaining an extract by filtration using the apparatus of FIG. 3.

As shown in FIG. 4(a), the filter paper 2 is fitted in the tray 1 for receiving extracted liquid and, as shown in FIG. 4(b), the insulating adaptor 11 is then inserted into the body 4. Subsequently as shown in FIG. 4(c), the bag 33 containing the holder 12 is inserted into the insulating adaptor 11. The upper margin or peripheral portion of the bag 33 is then externally unfolded at the upper opening of the body 5 as shown in FIG. 5 and the holder 12 is removed from the bag 33 and the stopper 8 is fitted into the air vent 7.

Ground coffee, equivalent in amount to one measuring cup (approximately 10 g/per person), is put into the bag 33 and boiling water is poured into the body 4. The tray 1, provided with the filter paper, for receiving the extracted liquid is placed on the body 4 in such a manner as to make the filter paper 2 abut against the upper opening edge of the body 4 or, as shown in FIG. 5, overlie the peripheral portion of the bag 33. The body 4 is combined with the tray 1 for receiving the extracted liquid by engaging the male thread 5 on the outer periphery of the former with the female thread 6 on the inner periphery of the latter. The combination of the body 4 and the tray 1 is turned upside down and placed on a coffee vessel such as the cup 9 or the like.

The air vent 7 is bored in the side wall or bottom of the body 4 at a position between the mid-portion covering an area from the face of the filter paper at the bottom of the boiling water poured into the body 4 up to the liquid level L and the bottom of the inverted body 4 when the body 4 is turned upside down and placed on top of the cup 9.

The air vent 7 is employed for shutting off air outside the body 4 by inserting the stopper 8 and letting the external pressure act on the coffee extract liquid or the like by removing the stopper 8 to introduce the air therethrough.

The stopper 8 is removed from the body 4 placed upside down on the hot beverage cup 9 after passage of the time desired to introduce air from the upper portion of the body 4 into the gap between the bag 33 and the inner wall of the body 4 and to let the external pressure act on the coffee extract liquid in the bag 33. Then the coffee extract liquid is caused to flow down into the cup 9 or the like via the filter paper 2 and the tray 1 for receiving the coffee extract liquid or the like.

Through the aforementioned process, the temperature, taste and color of the extracted liquid becomes ideal.

Figure 6:
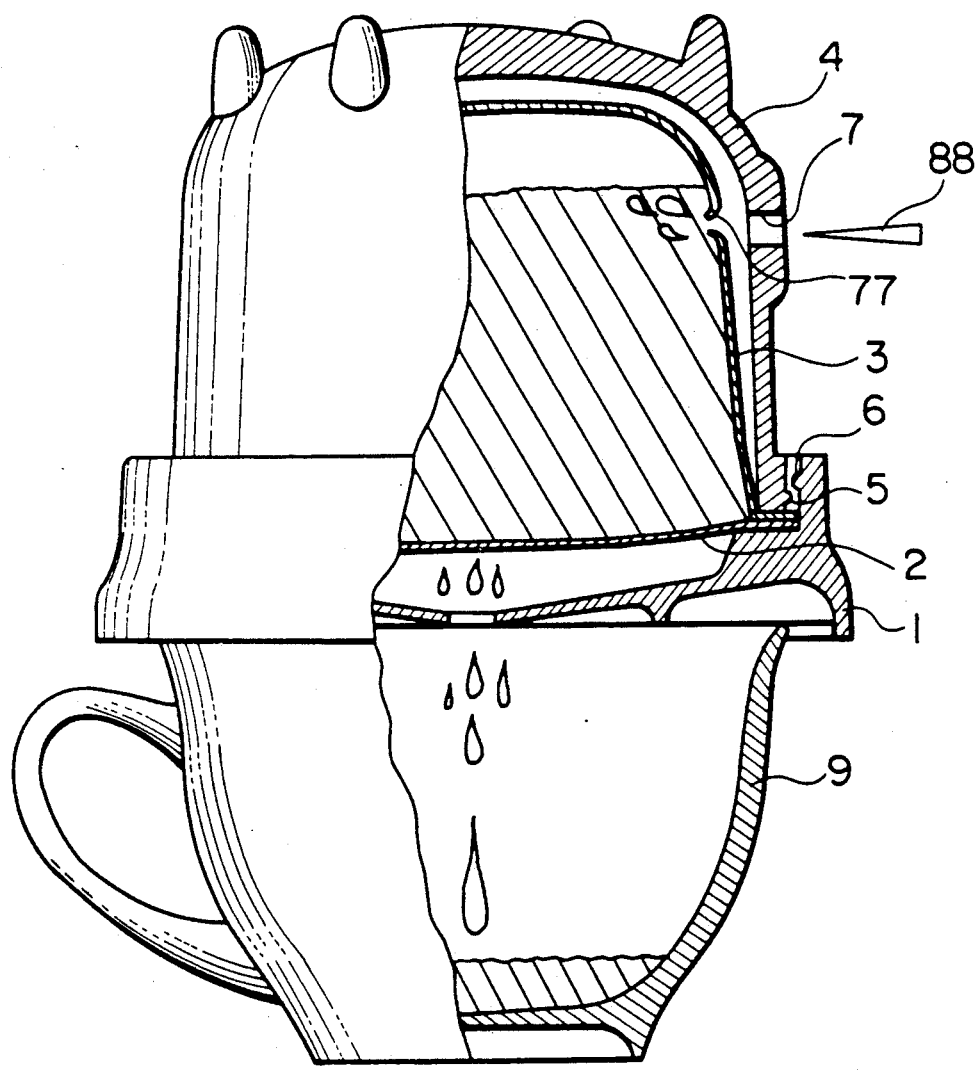
FIG. 6 is a diagram illustrating another method of obtaining an extract by filtration according to the present invention.

Alternately, the air vent 7 can be left open as shown in FIG. 6 and a conical body 88 may be inserted into the air vent 7 to punch a through-hole 77 in the cup 3 so as to release the air seal between the interior and exterior of the cup 3. External air is thus allowed to act on the coffee extract liquid or the like, which is then caused to flow into the cup 9. The cup 3 is made of, e.g. OP film.

Figure 7:
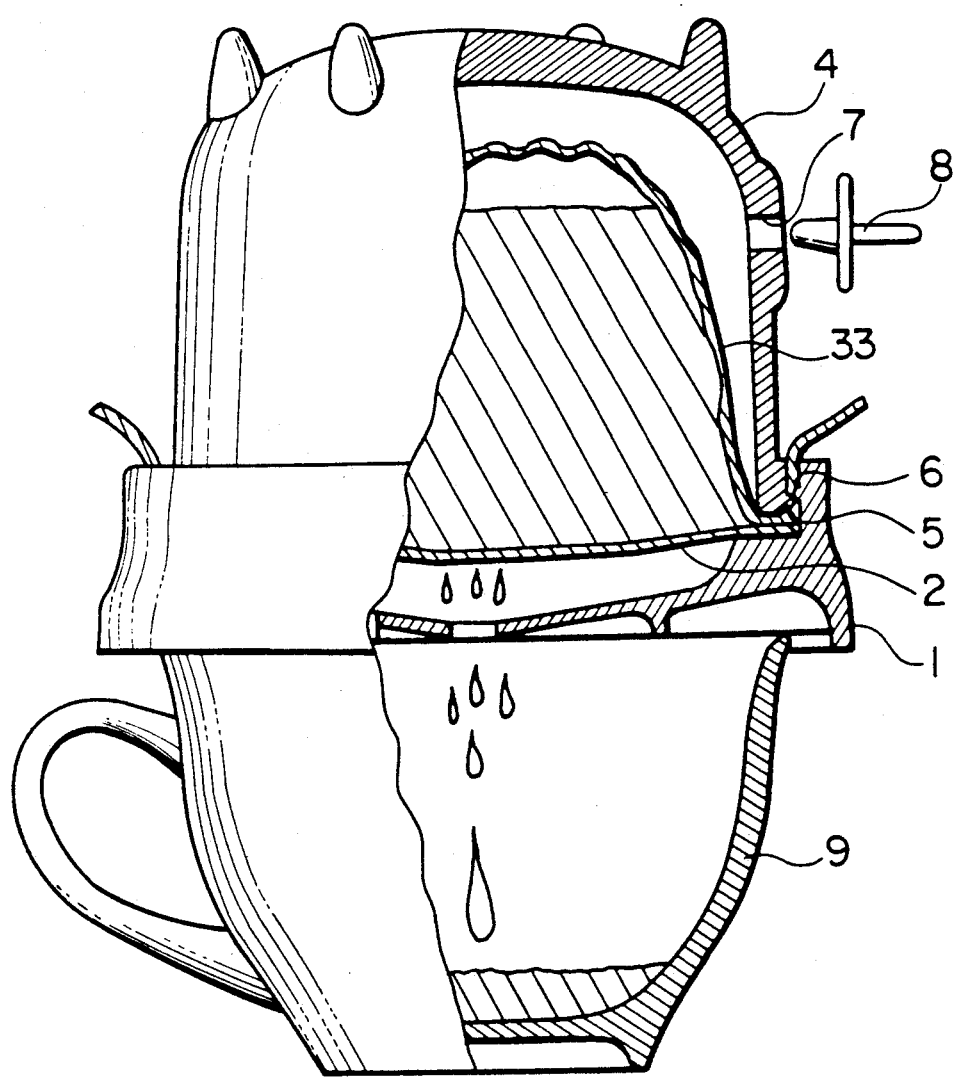
FIG. 7 is a diagram illustrating still another method of obtaining an extract by filtration according to the present invention.
Figure 8:
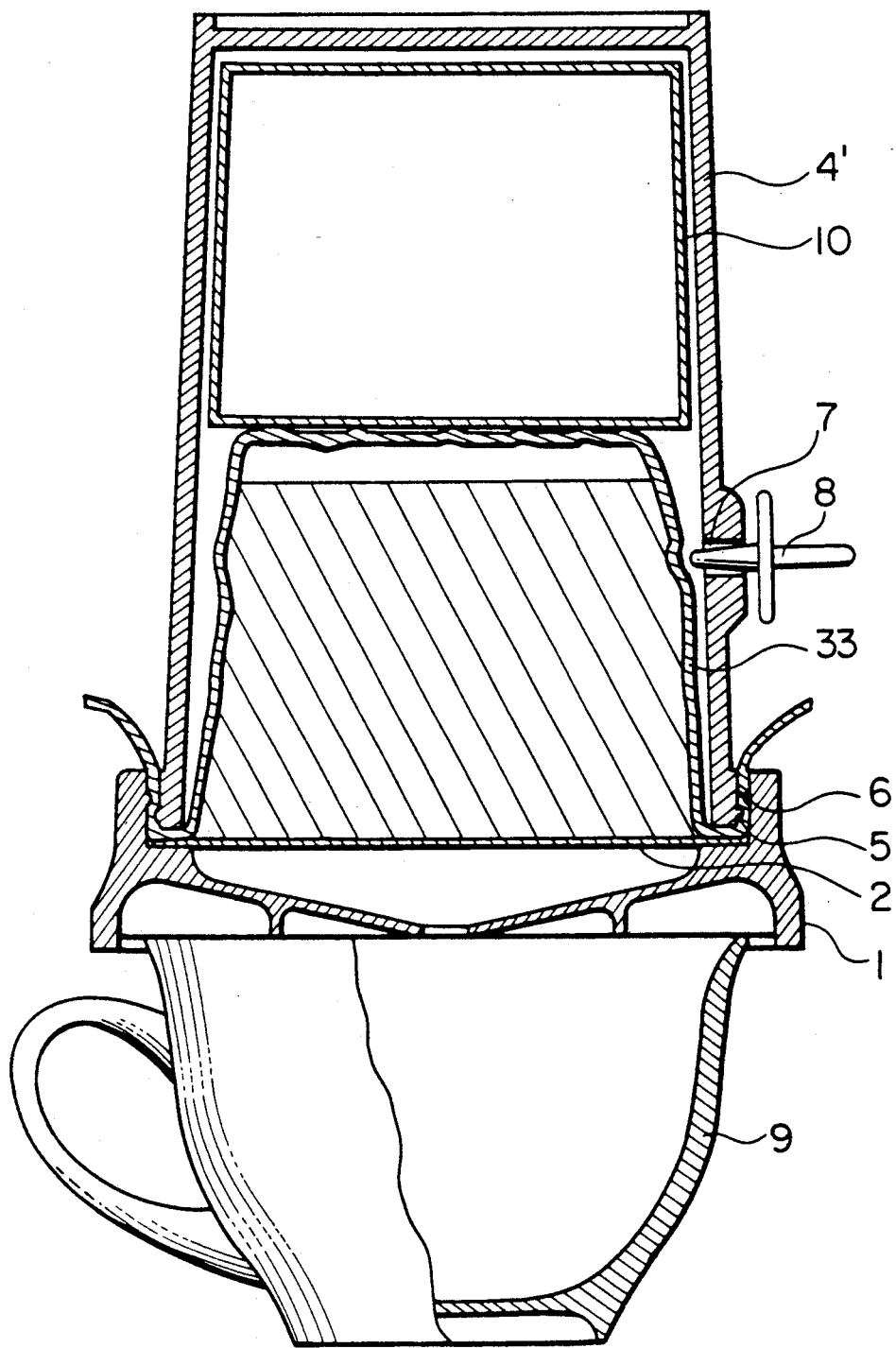
FIG. 8 is a diagram illustrating still another method of obtaining an extract by filtration according to the present invention.

FIG. 7 shows an example similar to the arrangement shown in FIG. 5 without the use of the insulating adaptor 11, whereas FIG. 8 shows a case where a spacer 10 is inserted into a body 4 sized for use in making coffee or the like for two persons, in order to provide a coffee maker for use by one person. The spacer 10 is of a suitable size and, as shown in FIG. 8, is hollow.

When coffee is prepared for one person as shown in FIG. 8, there can be provided two spacers 10, one of which is used as an ordinary spacer as shown therein, whereas the other may be used, in place of the holder 12, when the bag 33 for one person is inserted into the body 4. When coffee is prepared for two persons, moreover, a holder for two persons may be employed for the bag for two persons or two spacers 10 may be inserted into the bag for two persons one by one to substitute for a holder for two persons. Coffee can be prepared for two persons when a bag for two persons is inserted into the body 4.

In a case where the bag 33 is used, thin paper such as tissue paper may be used to soak up the extracted liquid sticking to the apparatus after use. The filter paper 2 together with the thin paper used for wiping may be placed in the bag 33 containing coffee grounds. The bag 33 is then taken out and disposed of.

Although a description has been given of obtaining mainly an extract of coffee, the present invention is also applicable for obtaining extracts of black tea or green tea by filtration as simply as in the case of coffee and in a manner which provides a drink of optimum taste. Moreover, the work of cleaning up is simple.

The present invention has the effect of facilitating the adjustment of extraction time and having coffee or the like extracted to personal taste at any time and place quickly and reliably to ensure an excellent taste of coffee or the like in the best condition while saving the troublesome work of cleaning up after use, thus making a valuable contribution to people's lives.

I claim:

1. An apparatus for obtaining a hot beverage extract liquid by filtration, comprising:
   a vessel body for containing a hot beverage forming material and hot water, said vessel body having a first end with an opening formed therein, a second closed end, and an air vent located near said second end;
   means, comprising a stopper, for selectively sealing said air vent to make it airtight;
   means, comprising a bag disposed in said vessel body, for simultaneously holding the hot beverage forming material and hot water, said bag having a closed end and an open end with a peripheral portion, said peripheral portion being foldable outwardly at said opening in said first end of said vessel body;
   a filter paper for covering said opening in said first end of said vessel body, said filter paper having a peripheral portion adapted to overlie said peripheral portion of said open end of said bag;
   a tray having first and second surfaces, means on said first surface for mounting a hot beverage cup thereto, and means on said second surface for receiving said first end of said vessel body with said peripheral portions of said filter paper and said bag being disposed between said first end of said vessel body and said second surface of said tray; and
   means, on said tray and said vessel body, for sealingly attaching said first end of said vessel body with said second surface of said tray to form an airtight seal therebetween.

2. An apparatus as recited in claim 1, wherein said attaching means comprises complementary threads formed respectively on said tray and said vessel body.

3. An apparatus as recited in claim 2, wherein said threads formed on said tray are female threads; said threads formed on said vessel body are male threads; and said peripheral portion of said filter paper overlies said peripheral portion of said bag.

4. An apparatus as recited in claim 1, further comprising
   an insulating adaptor having at least one vent through-hole in a bottom end thereof, being adapted to be disposed inside said vessel body, and being adapted to receive said bag, such that when said insulating adaptor, said vessel body and said bag are assembled together said insulating adaptor insulates said bag from said vessel body.

5. An apparatus ar recited in claim 1, further comprising
   an insulating adaptor mounted between said bag and said vessel body.

6. An apparatus as recited in claim 5, wherein said bag comprises a deformable thin film bag.

7. An apparatus as recited in claim 1, further comprising
   a hollow spacer of a predetermined size adapted to be disposed in said vessel body between said second end of said vessel body and said closed end of said bag.

8. A method for obtaining a hot beverage extract liquid by filtration, comprising the steps of:
   assembling a vessel by mounting a cup, formed of a perforable material, in a vessel body having a closed vent, and radially outwardly folding a peripheral portion of an open end of said cup;
   depositing a desired amount of ground hot beverage forming material in said cup and pouring hot water into the hot beverage forming material;
   attaching a tray for receiving a hot beverage extract liquid to said vessel at an open end thereof with said peripheral portion of said cup being radially outwardly folded at said open end of said vessel and a filter paper being mounted between said vessel body and said cup;

turning said vessel with said tray attached thereto upside down on top of a hot beverage cup;

allowing a predetermined amount of time to pass so as to cause the ground hot beverage forming material and the hot water to form a hot beverage extract liquid; and opening said vent and passing a conical body therethrough to pierce said cup, such that external air pressure acts on the hot beverage extract liquid in said cup and causes said hot beverage extract liquid to flow through said filter paper and said tray into said hot beverage cup.

* * * * *